United States Patent [19]
van der Schoot

[11] 4,068,882
[45] Jan. 17, 1978

[54] CARRIER FOR ARTICLES, SUCH AS EGGS

[75] Inventor: Jelle van der Schoot, Aalten, Netherlands

[73] Assignee: Staalkat B.V., Aalten, Netherlands

[21] Appl. No.: 742,248

[22] Filed: Nov. 16, 1976

[30] Foreign Application Priority Data

Nov. 21, 1975  Netherlands .......................... 7513631

[51] Int. Cl.$^2$ .............................................. B66C 1/42
[52] U.S. Cl. .................................... 294/116; 198/653; 198/695; 198/696; 294/106; 294/87 A
[58] Field of Search ...................... 294/16, 87 R, 87 A, 294/87.22, 87.24, 99 R, 99 S, 99 AJ, 106, 110 R, 116; 198/479, 486, 653, 694, 695, 696

[56] References Cited
U.S. PATENT DOCUMENTS

| | | | |
|---|---|---|---|
| 2,714,523 | 8/1955 | Bliss | 294/87 A |
| 2,954,996 | 10/1960 | Carkhuff | 294/99 R X |
| 3,204,997 | 9/1965 | Vries | 294/86 R X |
| 3,545,804 | 12/1970 | Richner | 294/116 |

FOREIGN PATENT DOCUMENTS

| | | | |
|---|---|---|---|
| 164,918 | 9/1955 | Australia | 294/87 A |
| 281,244 | 12/1970 | U.S.S.R. | 294/87 A |

*Primary Examiner*—Johnny D. Cherry
*Attorney, Agent, or Firm*—Scully, Scott, Murphy and Presser

[57] ABSTRACT

A carrier for articles, such as eggs, provided with two hook-shaped gripper portions, the "free" ends of which have openings for receiving an article having its longitudinal axis oriented substantially horizontally, and the other facing ends are so pivotally mounted around shafts mounted in a frame that the "free" gripper ends can be moved towards and from each other, which shafts at minimum interspace between the "free" gripper ends always lie in or inwardly of the plane of the opening of the "free" end in question.

9 Claims, 5 Drawing Figures

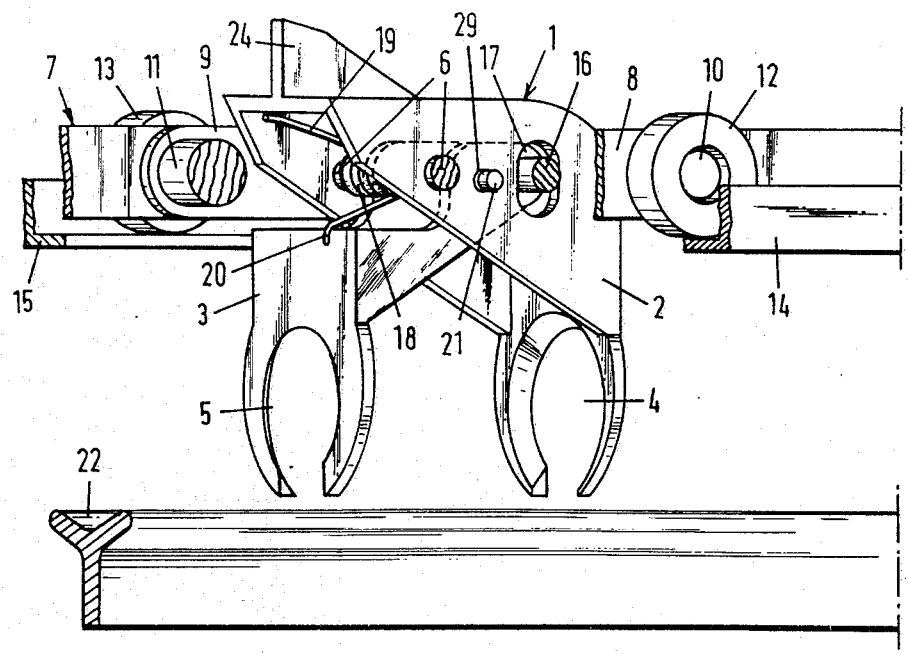
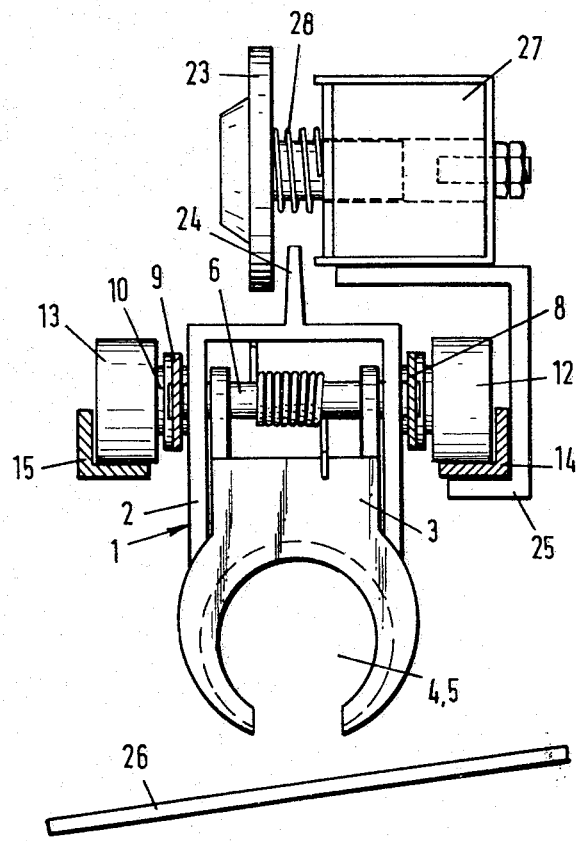
FIG. 1
FIG. 2

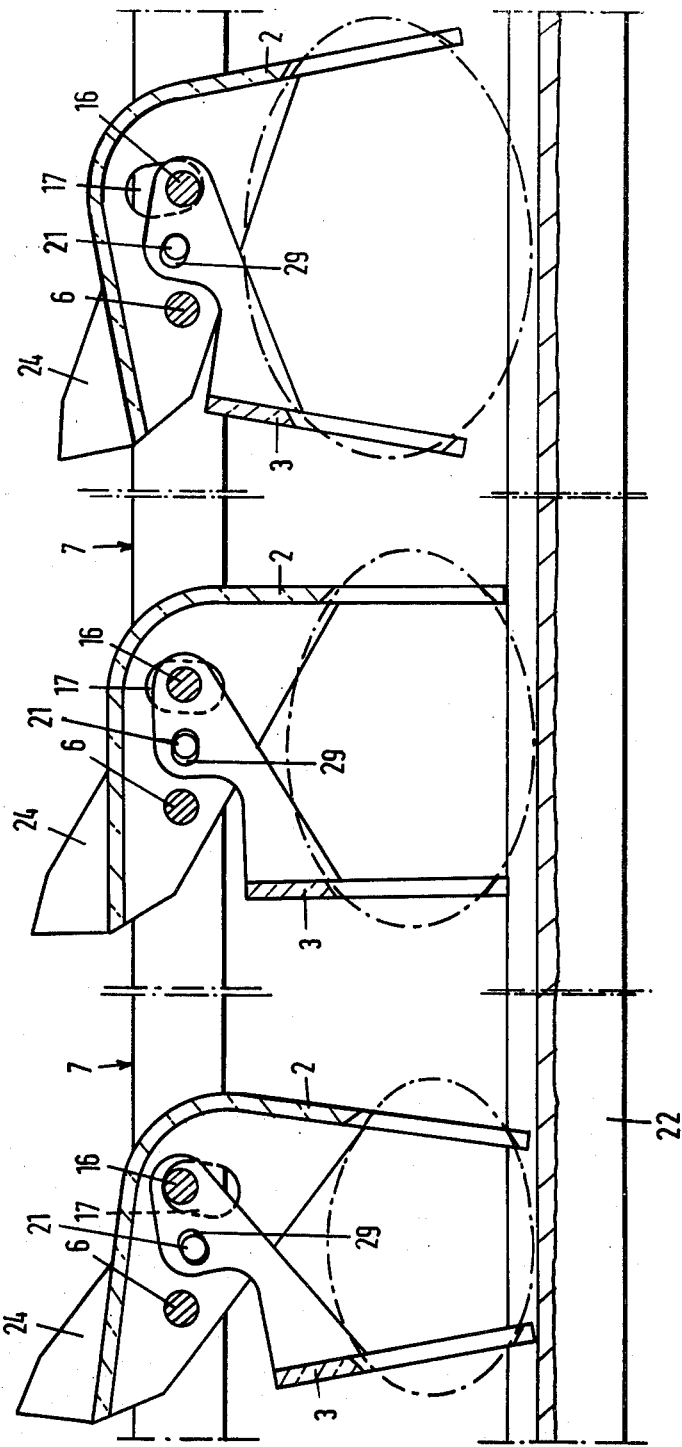

CARRIER FOR ARTICLES, SUCH AS EGGS

The invention relates to a carrier for articles, such as eggs.

It is the object of the invention to so design such a carrier that therewith can be taken up without disturbances variously sized articles present on a specific surface and having their longitudinal axes oriented substantially horizontally.

For this purpose the carrier is provided with two hook-shaped gripper portions, the "free" ends of which have openings for receiving an article, and the other facing ends are so pivotally mounted around shafts mounted in a frame that the "free" gripper ends can be moved towards and from each other, which shafts at minimum interspace between the "free" gripper ends always lie in or inwardly of the plane of the opening of the "free" end in question. As a result the axes of said openings, when from a specific plane are taken up articles which are oriented with respect to their longitudinal axes, will always substantially coincide with said longitudinal axis, so that the articles are taken up smoothly and uniformly.

In a further elaboration of the invention the axis of rotation of each hook-shaped gripper portion may lie at the other side of the median perpendicular plane between the "free" ends.

The carrier may be provided with a spring urging together the "free" ends, and with means for coupling the movements of the gripper portions, so that the "free" ends are always uniformly moved towards each other in order to take up therebetween an article.

Furthermore there may be provided means for bounding the movements of the gripper portions.

In order that the carrier may be easily opened, one of the gripper portions may be provided with cam means.

In order to be able to take up without disturbances with the above described carrier articles, in particular eggs, having very large longitudinal dimensions, without having to make the dimensions of the carrier correspondingly larger, the annular bevelled receiving openings may at the bottom side be provided with a recess.

One embodiment of the carrier according to the invention will now be explained, by way of example, with reference to the accompanying drawings, wherein:

FIG. 1 is a perspective view, portions being partly broken away, of a carrier for eggs mounted on a chain link in the position of a loading station;

FIG. 2 is a schematic front view of the egg carrier according to FIG. 1 in the position of a discharging station; and FIGS. 3-5 are schematic views of the egg carrier according to FIG. 1 containing eggs of different size in the position of the loading station.

As is shown in the drawings, an egg carrier 1 mounted on a chain link 7 comprises two hook-shaped gripper portions 2 and 3, in the "free" ends of which there are provided bevelled egg-receiving openings 4 and 5.

By means of a shaft 6 the gripper portion 2 is pivotally mounted to and between link plates 8 and 9 of chain link 7, which link is furthermore provided with connecting shafts 10 and 11. On the connecting shafts there are furthermore mounted rollers 12 and 13 adapted to roll over guide profiles 14 and 15, attached to a frame 25 (FIG. 2).

The other gripper portion 3 is also pivotally mounted by means of a shaft 16 to and between the link plates 8 and 9.

The legs of gripper portion 3 are located between those of gripper portion 2. In this connection the legs of gripper portion 2 are provided with slots 17 for passing shaft 16 of gripper portion 3.

On shaft 6 there is furthermore mounted a spring 18, the ends 19 and 20 of which find support against gripper portions 2 and 3, respectively, namely in such a manner that the egg-receiving openings thereof are moved towards each other. In order to ensure that the movements of the gripper portions, which movements are bounded by the size of slot 17, follow each other, the gripper portions are coupled by means of a catch pin 21 which is fixedly attached between the legs of gripper portion 2 and extends through slots 29 into the legs of the other gripper portion 3.

The shape of the gripper portions and the arrangement thereof between the link plates is so selected that an egg of any size can easily and reliably be taken up from a specific plane. In the apparatus as shown each time a number of weighed eggs is taken up simultaneously. For this purpose a corresponding number of grippers is simultaneously opened by operation of cams 24 arranged at the top side of each gripper portion 2, and the supplied eggs are brought into the grippers via an upwardly and downwardly movable trough 22 (FIG. 1).

In the position of the discharging station (FIG. 2) there is located above the rotary chain and attached to frame 25 a cam 23 which is adapted to co-operate with cam 24. When cam 23 contacts cam 24, the gripper is opened, thus releasing the egg contained therein, which egg then rolls away sideways over the table 26 which is arranged at an angle in the position of the discharge station.

The rotary movements of the receiving openings 4 and 5 are such that, when an egg present in trough 22 is taken up, the axes of said openings always completely or substantially completely coincide with the longitudinal axis of the egg.

In the embodiment shown in FIG. 2, cam 23 consists of a spring 28-loaded disc or roller which can be brought into the path of cams 24, which disc or roller is operated by a magnet coil 27 or the like which in turn is operated by a memory device moving along with the intermittently moved chain, in dependence on the weight of the egg to be discharged.

In order to ensure that in case of very large eggs the ends thereof are not damaged and the required maximum distance between openings 4 and 5 can be reduced, said openings are not closed but at the bottom side are designed as an open construction.

I claim:

1. A carrier for articles, such as eggs, comprising:
  a. a frame;
  b. two hook-shaped gripper means, each of which has a free end which has an opening, for receiving between said free ends an article having its longitudinal axis oriented substantially horizontally;
  c. shafts, mounted in said frame, for pivotally mounting the other ends, opposite said free ends, of said hookshaped gripper means, so that the free gripper ends can be moved towards and from each other, which shafts at minimum interspace between the free gripper ends always lie inwardly of the plane of the opening of the free end of the gripper means mounted on that shaft and wherein said shaft for each hook-spaced gripper means lies on a side of the median perpendicular plane between the free ends which is opposite to the side on which the free end lies which is supported by that shaft; and d. means for pivotally mounting said other ends of the hook-shaped gripper means on their respective shafts.

2. A carrier according to claim 1 and including spring means for urging together the free ends of the two hook-shaped gripper means.

3. A carrier according to claim 2 and including means for coupling the movements of the two hook-shaped gripper means 4. A carrier according to claim 3 and including means for limiting the movements of the gripper means.

5. A carrier according to claim 4 and wherein one of said gripper means is provided with a cam means.

6. A carrier according to claim 5 wherein each free end of the gripper means has an annular opening therein which is bevelled on its inside.

7. A carrier according to claim 6 wherein each free end of the gripper means has an annular opening having a recess at its bottom side.

8. A coupler according to claim 1 and wherein one of said gripper means is provided with a cam means.

9. A coupler according to claim 1 wherein each free end of the gripper means has an annular opening therein which is bevelled on its inside.

* * * * *